United States Patent
Muijs et al.

(10) Patent No.: US 8,605,202 B2
(45) Date of Patent: Dec. 10, 2013

(54) MOTION OF IMAGE SENSOR, LENS AND/OR FOCAL LENGTH TO REDUCE MOTION BLUR

(75) Inventors: Remco Theodorus Johannes Muijs, Eindhoven (NL); Dmitry Nikolaevich Znamenskiy, Eindhoven (NL); Harold Agnes Wilhelmus Schmeitz, Eindhoven (NL); Ruud Vlutters, Eindhoven (NL); Franciscus Hendrikus Van Heesch, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 39 days.

(21) Appl. No.: 13/319,800

(22) PCT Filed: Apr. 28, 2010

(86) PCT No.: PCT/IB2010/051847
§ 371 (c)(1),
(2), (4) Date: Nov. 10, 2011

(87) PCT Pub. No.: WO2010/131142
PCT Pub. Date: Nov. 18, 2010

(65) Prior Publication Data
US 2012/0062787 A1    Mar. 15, 2012

(30) Foreign Application Priority Data

May 12, 2009 (EP) .................................. 09160007
Jun. 23, 2009 (EP) .................................. 09163440

(51) Int. Cl.
*G03B 13/00* (2006.01)
*G03B 7/00* (2006.01)

(52) U.S. Cl.
USPC ............ 348/345; 348/297; 348/347; 348/362

(58) Field of Classification Search
USPC ............................................... 348/222.1, 297
See application file for complete search history.

(56) References Cited

U.S. PATENT DOCUMENTS

| 5,134,432 | A  | * | 7/1992  | Kohmoto et al. ............... 396/76 |
| 6,930,676 | B2 |   | 8/2005  | De Haan et al. |
| 2008/0013941 | A1 | * | 1/2008 | Daley ........................... 396/121 |
| 2009/0244300 | A1 |   | 10/2009 | Levin et al. |

FOREIGN PATENT DOCUMENTS

| WO | 2008008152 A2 | 1/2008 |
| WO | 2009120718 A1 | 10/2009 |

OTHER PUBLICATIONS

Nagahara et al: "Flexible Depth of Field Photography"; Lecture Notes in Computer Science, vol. 5305, Oct. 2008, pp. 60-73.
Levin et al: "Motion-Invariant Photography": ACM Transactions on Graphics, vol. 27, No. 3, Aug. 2008, pp. 1-9.

* cited by examiner

*Primary Examiner* — Michael Osinski
*Assistant Examiner* — Quan Pham

(57) ABSTRACT

A camera and system comprising a camera in which, during exposure, the ratio of the distance between the lens and the sensor and the focal length is changed. The rate of change is set such that motion invariant imaging is achievable for practical speed ranges, i.e. speed of up to at least 5 km/hour at 2 meter distance of the lens, by deconvoluting the compound image. Preferably the achievable speed range is at least twice as high. A linear motion of the sensor is preferred.

14 Claims, 10 Drawing Sheets

MOTION OF IMAGE SENSOR, LENS AND/OR FOCAL LENGTH TO REDUCE MOTION BLUR

FIELD OF THE INVENTION

The invention relates to a camera comprising a lens and an image sensor wherein the ratio of the distance between the sensor and the lens along the optical axis and the focal length of the lens is changed during the exposure time of the image. The invention also relates to a method for deconvoluting image data captured by an image sensor.

BACKGROUND OF THE INVENTION

Conventional image sensors, such as CMOS and CCD sensors, integrate all light that impinges on them during the exposure time. This provides sharp images of static objects, but results in spatial blur for objects that move while the shutter is open. Objects that are not in focus are also blurred. The so-called motion blur is proportional to the exposure time and object velocity. The former is particularly troublesome when a camera operates under low light level conditions. Under such circumstances, long exposure times are desired to attain sufficiently high signal-to-noise levels such that the dark areas of a scene can be imaged adequately. Consequently, many cameras suffer from a classic trade-off between motion blur and dynamic range. The exposure times need to be long to capture enough light, but need to be small so as to reduce motion blur. Within the framework of the invention the word camera comprises cameras for taking photographs as well as cameras for video purposes.

A camera and method of the type described in the first paragraph are known from an article by Nagahara et al "Flexible Depth of Field Photography", H. Nagahara, S. Kuthirummal, C. Zhou, and S. K. Nayar, European Conference on Computer Vision (ECCV), October, 2008.

In Nagahara et al a camera for taking photographs is shown in which the distance between the sensor and a fixed focus lens is varied. The sensor is swept over a distance during the exposure time. The sweeping distance is arranged to sweep a range of scene depth ranges in order to increase the depth of field. The prior art camera disclosed in Nagahara et al reduces out-of-focus blur. To reduce the out-of-focus blur the sensor is swept along the optical axis to cover certain depth ranges.

The sweeping of the sensor provides for a compound image, in effect being a combination of a number of images at various focal depths. A point spread function (PSF) can be calculated. A point spread function is, in effect, the image a point of an object would make on the sensor. For an object completely in focus the point spread would be zero, and thus the PSF would be a Dirac function. The Fourier transform of this function would be a constant for all frequencies. For a point not in focus the PSF is a spread-out function, for an object in motion while the camera is fixed, the PSF would be spread out over a distance due to the motion. From the PSF one can calculate an inverse point spread function (IPSF). Deconvoluting the compound image allows a sharp image to be obtained and an increased depth of field is obtained. This is due to the fact that, as Nagahara shows, when the sensor is swept the PSF for static objects at various distances becomes to a considerable degree the same. Thus, deconvolution the original image with one and the same IPSF would allow a sharp image at all distances, or at least an increased range of distance and the an increased depth of field is obtained for static objects.

Although out-of-focus blur and the reduction thereof may be and is important, a major problem, as explained above, exists and remains for moving objects, namely the motion blur, especially for larger exposure times.

Nagahara already mentions the problems associated with motion blur without giving a solution.

A known solution for reducing motion blur is to move the sensor perpendicular to the optical axis. This solution is known for instance from an article by Levin et al. "Motion-Invariant Photography", A. Levin, P. Sand, T. S. Cho, F. Durand, W. T. Freeman. SIGGRAPH, ACM Transactions on Graphics, August 2008. In essence, this solution amounts to moving the sensor from left to right (or vice versa) during the exposure to reduce motion blur due to a horizontal motion.

Apart from the solution suggested in Levin et al to, motion blur can be inverted by means of video processing. This is achieved by motion estimation and inverse filtering along the motion trajectory. This is known for instance from U.S. Pat. No. 6,930,676. In practice however, the results of such a procedure suffer from inaccurate motion vectors, particularly for occlusion areas. One has to know the motion trajectory and deduce motion vectors from them to be able to do the inverse filtering. In many stand-alone cameras used in professional applications, motion vectors may not be available at all. For example, the recordings of many cameras used for surveillance or activity monitoring merely provide input to computer-vision-based analysis procedures (e.g., automatic detection of suspicious objects, fall-detection for elderly, etc). In these scenarios, the quality of the raw input frames is a determining factor for the performance of the detection system. Sufficiently accurate motion vectors may not be available on-the-fly within the camera and post-processing of recorded video is not an option in real-time monitoring systems. For a camera that takes a single snapshot it is fundamentally impossible to accurately determine motion vectors. At occlusion areas estimation of motion is also extremely difficult and inaccurate, if at all possible. At low light conditions the problems increase, due to the lack of light.

Second, most traditional cameras feature an adjustable shutter and aperture that windows the light coming through the lens in the temporal and spatial dimensions. These can typically be characterized as box filters (i.e. a constant sensitivity over a finite interval), corresponding to a sinc modulation in the corresponding temporal and spatial frequency domains. As a result, some high frequencies are fully suppressed during acquisition and cannot be recovered during inverse FIR filtering even when perfect motion information would be available. In practice, inverse filtering should be done with utmost care to prevent the amplification of noise and the introduction of artefacts.

In short, an effective and simple means for reducing motion blur is not known from prior art.

SUMMARY OF THE INVENTION

It is an object to the invention to reduce motion blur.

To this end the camera according to the invention is characterized in that the camera is arranged to operate such that the following holds:

$$V_{sweep} * A/b^2 > 0.25 \text{ sec}^{-1}$$

Wherein $V_{sweep}$ is the motion of the sensor and/or the lens along the optical axis and/or the change in focal length of the lens, A is the lens aperture and b is the distance lens-sensor.

$V_{sweep}$, A and b are all expressed in the same distance measure.

"Expressed in the same distance measure" means that all are expressed in for instance mm/sec and mm, or cm/sec and cm.

Prima facie there may seem to be a contradiction; motion blur is caused by movement of object in a direction perpendicular to the optical axis, for instance in a horizontal or vertical direction, whereas the motion of the sensor is along the optical axis. The image as captured shows motion blur in for instance a horizontal or vertical direction, depending on the direction of motion of the object, and consequently, it does not seem a logical choice to reduce motion blur by moving the sensor along the optical axis and it seems a logical choice to move the sensor perpendicular to the optical axis as in Levin et al.

The inventors have however realized that a motion of the sensor vis-à-vis a focal plane along the optical axis can be in fact be used to effectively counteract motion blur, provided certain conditions are fulfilled. By sweeping the sensor along the optical axis the motion blur kernel becomes to a high degree the same for a range of object velocities. The PSF is to a high degree the same for a range of object velocities. This allows for a motion invariant imaging by using an IPSF which provides a sharp image for a range of object velocities.

The inventors have realized that the maximum object velocity, i.e. the range of object velocities within which motion-invariant or near motion-invariant imaging can be accomplished, depends on a number of factors, including the speed of the sensor motion or focus sweep rate,
the aperture of the main lens and
the average distance between the sensor and the lens.

The average distance can be determined for embodiments in which the sensor moves as the distance halfway into the sweep.

In retrospect, with hindsight of the present invention it can be calculated that in Nagahara et al up to a certain speed motion invariant imaging can be accomplished, but this range is, for all practical purposes, insignificant, inadequate and imperceptible, being in the range of 0 km/hour-0.1 km/hour. In practice this means, in keeping with the statements in Nagahara, that no effective motion invariant imaging can be achieved by the camera and method as disclosed in Nagahara. Nagahara was thus correct in stating the motion blur would be a problem. Using the teaching of Nagahara different PSF would have to be used for different speed and motion-invariant imaging is for that reason impossible.

It is remarked that Nagahara et al does not disclose that there is any possibility for motion invariant imaging.

The motion of the sensor of Nagahara and the reason for this motion as disclosed and discussed in Nagaharara is to sweep through various focussing depth. Focussing depth is a feature which extends along the same axis as the motion of the sensor, i.e. both the motion and the reason for the sensor motion are parallel to, in fact in line with, the optical axis.

The inventors have realized that a problem associated with a phenomenon due to object motion perpendicular to the optical axis can in fact be reduced by motion of the sensor along the optical axis, provided certain conditions are met.

The minimum value (0.25 sec$^{-1}$) for the parameter $V_{sweep}*A/b^2$, in order to be able to accomplish motion invariant imaging for practical object speeds and distances, is at least one order of magnitude higher than that known from the Nagahara.

It is remarked that motion of the sensor, within the concept of the invention to be regarded as a 'motion' of the sensor with respect to focal length. Such motion can be made by moving the sensor, by moving the lens or alternatively, by changing the focal length of the lens. In all these possibilities the sensors sweeps through a range of focal planes. Naturally, a combined motion wherein the sensor moves and simultaneously the focal length is changed is possible. For simplicity hereinbelow such 'movements or motions' of the sensor, however accomplished, will be called "sensor movements". The fact that the sensor or lens is moved along the optical axis (or the focal length is changed) does not rule out simultaneous movements of the sensor in directions perpendicular to the optical axis.

Preferably the parameter $V_{sweep}*A/b^2$ is more than 0.5 sec$^{-1}$, most preferably more than 1 sec$^{-1}$.

Preferably the parameter $V_{sweep}*A/b^2$ is less than 15 sec$^{-1}$, most preferably less than 5 sec$^{-1}$. Too large a parameter requires quite high sweep speeds or very small sensor distance.

Preferably the exposure time is between 0.005 and 0.05, most preferably between 0.01 and 0.05 seconds.

Too long an exposure time would require a very substantial movement of the sensor, possibly going out of range of reasonable movements of the sensor.

Within the preferred exposure time range the movement of the sensor is within reasonable bounds while yet providing quite long exposure times. Also, within this range of exposure times video sequences can be made.

In embodiments the change in ratio is such that the sensor reaches positions outside the range in which any of the objects are in focus.

Within the concept of the invention it is advantageous, in embodiments to move the sensor fast over a large range of positions, or in which the focal length is changed fast, to go outside the positions wherein any part of the image is in focus. The sweep of the sensor is thus beyond the range of all possible focus depths. Such positions provide information that enables to reduce the motion blur. To extend the range of sensor movements to outside the range needed for depth-of-focus helps in motion invariant imaging.

In embodiments the sweep is made dependent, at least in an upper range of exposure times, on the exposure time. The exposure time than determines the amount of apparent movement of the sensor.

In Nagahara the displacement of the sensor is fixed to sweep through the focal range. In the invention the speed of movement of the sensor is a determining factor, so that in preferred embodiments, for different exposure times the displacement of the sensor varies with exposure time.

Given that in the present invention the speed is a determining factor, for large exposure times the displacement of the sensor is relatively large, while for smaller exposure times the movement can be made relatively smaller while yet allowing an effective reduction of motion blur.

Within embodiments for a lower range of exposure times the speed of movement may be independent of exposure times. For such exposure times the speed of movement can be chosen such that the motion blur can be effectively reduced.

The invention also relates to a system for recording images comprising a camera, further comprising a deconvolutor for deconvolution of a recorded image.

The invention further relates to a method of operating a camera comprising a lens and an image sensor wherein the ratio of the distance between the image sensor and the lens and a focal length is changed along the optical axis during the exposure time of the image, in wherein the following holds:

$$V_{sweep}*A/b^2 > 0.25 \text{ sec}^{-1}$$

wherein $V_{sweep}$ is the motion of the sensor and/or the motion of the lens along the optical axis and/or the change in focal length per sec, A is the aperture and b is the distance between lens and sensor.

BRIEF DESCRIPTION OF THE DRAWINGS

These and other objects and advantageous aspects will become apparent from exemplary embodiments that will be described using the following Figs.

The figures are not drawn to scale. Generally, identical components are denoted by the same reference numerals in the figures.

DETAILED DESCRIPTION OF PREFERRED EMBODIMENTS

The invention is based on the insight that by changing the camera parameters during the exposure time, the characteristics of the recorded image can be modified. This is exploited to design a camera of which the motion blur is, within a practical speed range, almost independent of the motion of the objects and preferably one of which the frequency behaviour is such that the recorded signal is better suited for inverse filtering. This allows sharp images to be generated from longer exposure time recordings without the need for motion estimation. In other words, the camera in accordance with the invention can provide sharp images with high SNR even for very challenging optical imaging conditions: objects moving at various, unknown velocities under low illumination levels. To this end the sensor and/or the lens is, during the exposure time, moved along the optical axis, or alternatively or in addition, the focal length of the lens is modified during the exposure time. Changing the focal characteristics of a lens to change the focal length has an effect similar to moving the sensor to or from the lens, or moving the lens to or from the sensor. These various embodiments have in common that the ratio of the distance between the sensor and the lens along the optical axis (b) and the focal length (f) changes during the exposure.

Figure 1:
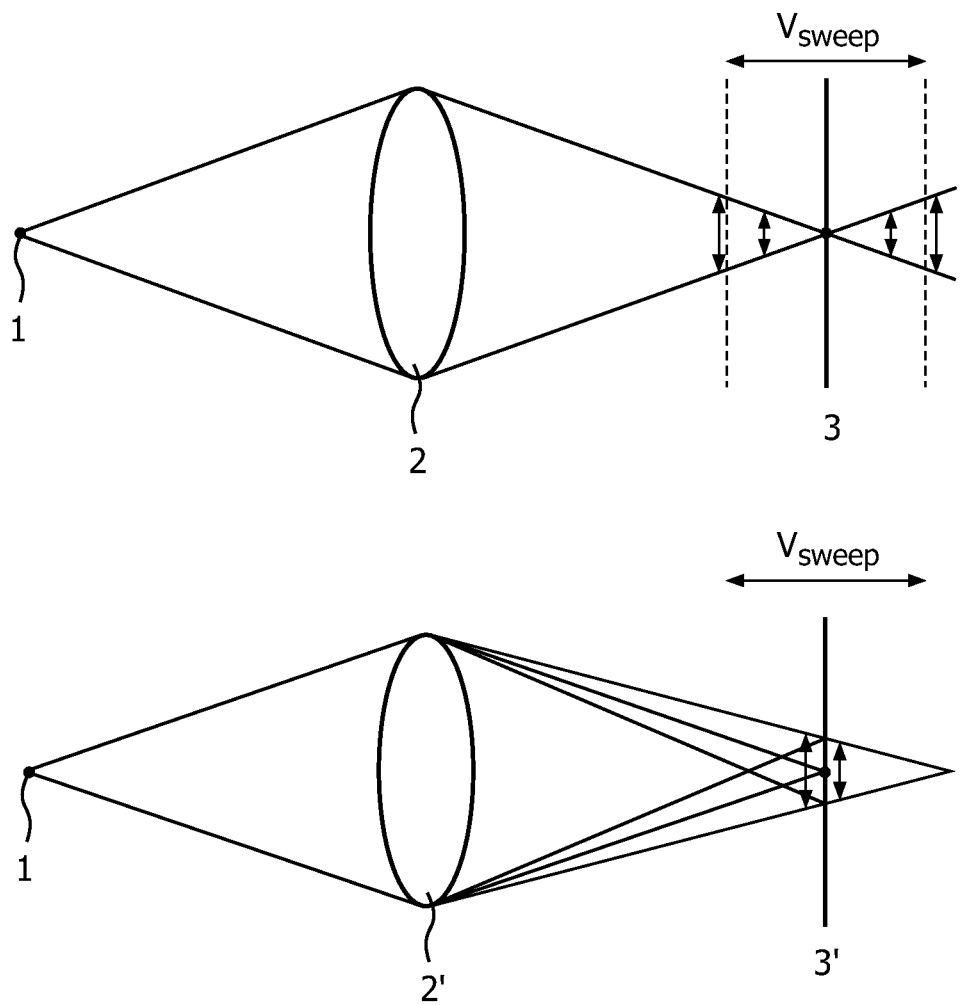
FIG. 1 illustrates various embodiments of the invention.

FIG. 1 illustrates various embodiments of the invention.

Object 1 is, through a lens 2, focussed. The focussed image is in FIG. 1 illustrated by the point where the light rays coming from the object cross. In the upper part of FIG. 1 the camera has a movable sensor 3. The sensor 3 is, during the exposure time, moved along the optical axis. In the upper part of FIG. 1 this is illustrated by dotted lines. The sensor motion can be expressed in a distance travelled per sec. This sweep velocity is called hereinbelow $V_{sweep}$. The lower part of FIG. 1 illustrates another way of apparent motion of the sensor 3 and lens with respect to each other. In this embodiment the sensor 3' is stationary but characteristics of lens 2' are changed, for instance by changing the form of the lens or the optical index of the lens. The lens itself may also be moved. As a consequence of changing the characteristics of the lens the focal plane is moved, which has a similar effect as moving the sensor as shown in the upper part of FIG. 1. Apparent movement of the sensor vis-à-vis the lens, within the invention, established in any of the above manners or in any combination of the above manners. A combination would be for instance to have part of the movement done by moving the sensor and part of the movement, for instance for fine-tuning the velocity or extension of the possible range of relative movements, by changing the focal length of lens 2. The sweep speed $V_{sweep}$ for a moving sensor is simply the amount of displacement of the sensor per sec. For a moving lens the sweep speed $V_{sweep}$ is the displacement of the lens per sec. If both move the sweep speed is the change in distance between the two per sec.

In case the sensor and lens are stationary and the focal length f of the lens is changed, which has an equivalent effect as moving the sensor and/or the lens, the sweep speed can be calculated as follows:

It holds that:

$$1/b=1/f-1/v$$

thus $f(t)=1/(1/v+1/(b(t)))$, where $b(t)$ stands for the position of the image plane.

Changing the focal length as a function of time thus changes the focal plane as follows:

$$f(t)=(v/(v+b(t)))*b(t)$$

at first order approximation, given that v is almost always much larger than b:

$$df(t)/dt=db(t)/dt$$

In that case $V_{sweep}$ is given by the change in focal length per sec.

In other words moving the sensor to and fro the lens while keeping the focal length constant is equivalent to keeping the sensor and lens at a fixed position while increasing and decreasing the focal length of the lens and the sweep speeds are in first order approximation equivalent parameters.

For a combined action, in which both the sensor and/or lens moves and the focal length f is changed the sweep rate is given by the sum of the two effects.

In all examples the ratio of the distance between the lens and the sensor (b) and the focal length f is changed during the sweep. One can change b, either by moving the sensor or the lens or both, or change f, or do both operations at the same time, or even consecutively.

Following figures explain the concepts of the invention.

For simplicity, image formation is considered as a 2D process (time and one spatial dimension, in the figures represented by x) in the following. However, the concepts discussed in this document extend to two lateral spatial dimensions (x, y).

Figure 2A:
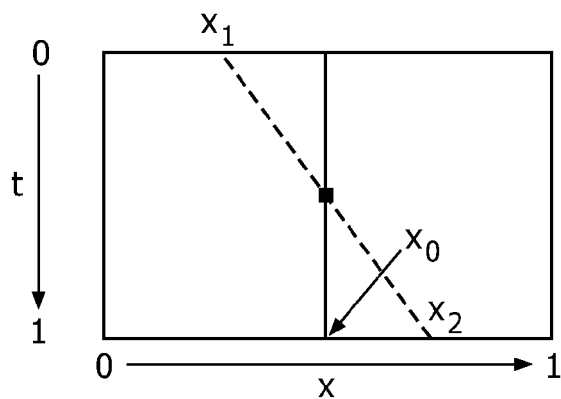
FIGS. 2A to 2C illustrate a shutter operation that is infinitesimally small in time, i.e. a Dirac function
Figure 2B:
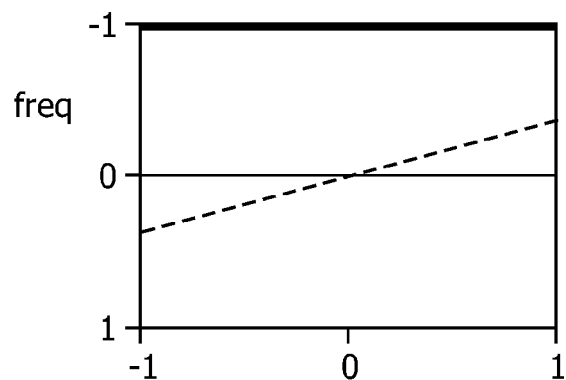
Figure 2C:
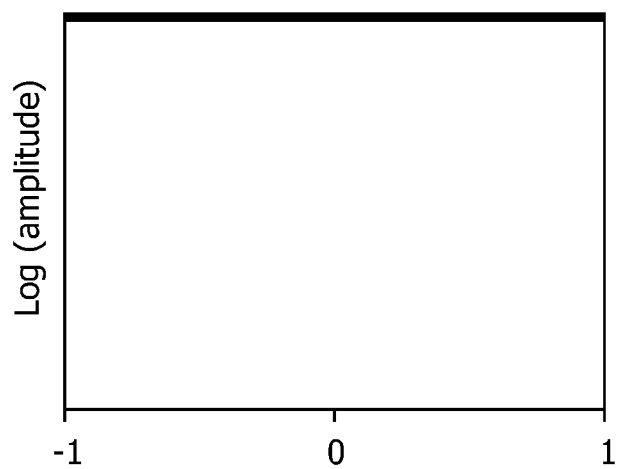

To better understand the concept of motion-invariant imaging, it is useful to first outline spatio-temporal sampling characteristics of conventional cameras. In a conventional optical imaging system, such as a photo camera, the camera is focused at an object of interest, which amounts to fixing the displacement between the sensor and lens at an appropriate distance. Perfect static and motion sharpness can then be obtained when the spatio-temporal shutter operation is infinitesimally small in space and time (a Dirac $\delta(x,t)$, i.e. a singular point in space and time), as shown in the FIG. 2A to 2C. FIG. 2A corresponds to the sampling of light in space-time. FIG. 2B illustrates the corresponding spatio-temporal amplitude spectrum and FIG. 2C shows cross-sections through the 2D amplitude spectrum corresponding to a static (uninterrupted line) and moving (interrupted line) object. In space time (FIG. 2A), a static object remains at its position all the time and thus is presented in FIG. 2A by a line at a fixed position $x_0$ all of the time, i.e. a vertical line. The vertical axis provides a normalized time wherein 0 stands for the point in time and 1 stands for a point in time, while 1 stands for another, later point in time. A moving object, moving from left to right, changes position during exposure moving to the right. The little square in the middle represent the exposure. The exposure is infinitesimally in time and in space, so it is an infinitesimally small point in space and time. For this idealized hypothetical shutter configuration, the sensor records all frequencies at the same intensity, resulting in identical frequency characteristics for different motions. FIG. 2B represents a Fourier transform of the acquired signal. This is a function that is 1 for all values. For a Dirac function, all frequencies are sampled equally and the amplitude at all wavenumbers is equal. FIG. 2C expresses in the form of a point spread function (PSF) wherein the amplitude is given at the vertical scale in logarithmic units at various wavenumbers, being the horizontal scale. FIG. 2B illustrates the fact that the Fourier transform of a Dirac function is a constant. Given that all frequencies are sampled equally the amplitude at all wavenumbers at all possible speeds is equal, i.e. the PSF function is a constant. The PSF functions are thus also equal. Equal PSF functions means that at all speeds of an object the image is equally sharp and can be reconstructed by deconvoluting the image. Thus a Dirac shutter would allow a sharp image at all speeds. However, a perfect Dirac shutter cannot be constructed and realistic approximations of it collect insufficient light to create a proper image. The image may be sharp for all speeds of an object in the image, but not enough light is captured to make the objects visible, which is highly impractical, to say the least. In practice, the shutter time (and aperture) is adjusted to the local light conditions and longer exposure times are required to collect sufficient light in dark environments to maintain an adequate signal-to-noise ratio. One way of solving the problems would be to develop sensors that are more sensitive to light, allowing the exposure time to become shorter and shorter approaching a Dirac function. However, in reality limits are posed on the sensitivity of the sensor.

Figure 3A:
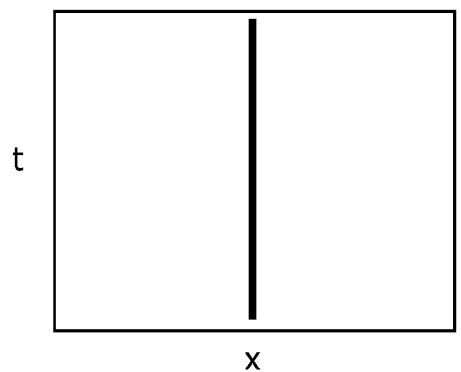
FIGS. 3A to 3C illustrate a normal shutter operation
Figure 3B:
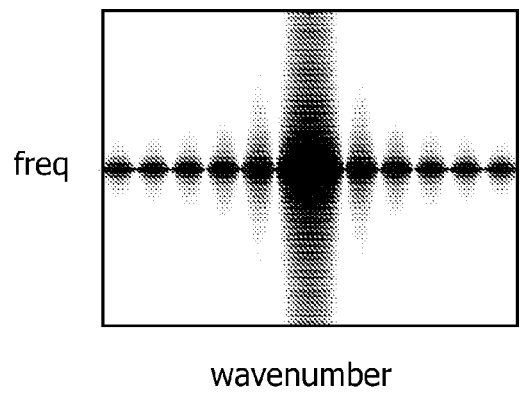
Figure 3C:
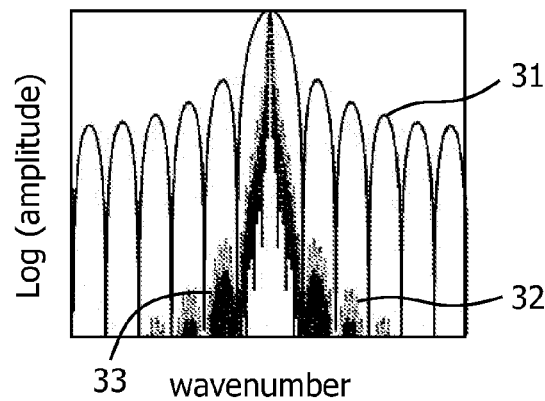

Most traditional cameras feature an adjustable shutter and aperture that windows the light coming through the lens in the temporal (i.e. during an exposure time) and spatial dimensions. These can typically be characterized as box filters (i.e. a constant sensitivity over a finite interval) in real time and space dimensions, corresponding to a sinc modulation in the corresponding temporal and spatial frequency domains. As a result, some high frequencies are fully suppressed during acquisition and cannot be recovered during inverse FIR filtering even when perfect motion information would be available. In practice, inverse filtering should be done with utmost care to prevent the amplification of noise and the introduction of artefacts. This is illustrated at FIGS. 3A to 3C. FIG. 3A illustrates the light impinging on the sensor. A realistic shutter has a finite extension, thus the box has a width in the x-direction. The box represents the light on the sensor, so the width represents the light spot on the sensor. The shutter is open during a shutter time t, wherein this shutter time t is represented on the vertical axis going from 0, start of the exposure to 1, end of the exposure.

In the temporal domain (FIG. 3B) and the spatial frequency domain (FIG. 3C) some high frequencies are suppressed, being shown in the dips in the figures. Some details are therefore lost and some artifacts are created. Furthermore three different PSF functions are shown, exemplifying three different PSF functions typical for objects moving through the image at 0, 50 and 100 km/hour at approximately 10 meter from the lens. These PSF functions are lines 31, 32 and 33 respectively. One sees that the three PSF functions differ greatly. Since the PSF functions are different for different speeds, one cannot use a single IPSF for deconvolution of the recorded image. In practice and in theory this means that it is impossible to deconvo lute by some inverse filtering the three images in a consistent manner. In short, motion invariant imaging is impossible.

For global motion, motion blur can be prevented by tracking the motion with the camera. Alternatively, this can be achieved by moving the sensor relative to the main lens at the desired speed along a lateral trajectory (perpendicular to the optical axis) during the exposure time. However, only objects moving at the target speed will be sharp in the recorded image, while all other scene areas remain blurred or become even more blurred than if nothing would have been done.

Figure 4A:
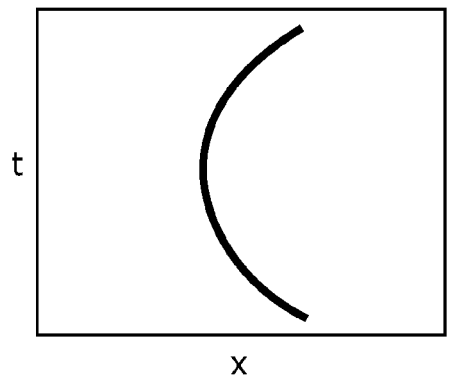
FIGS. 4A to 4C illustrate an operation as known from Levin et al
Figure 4B:
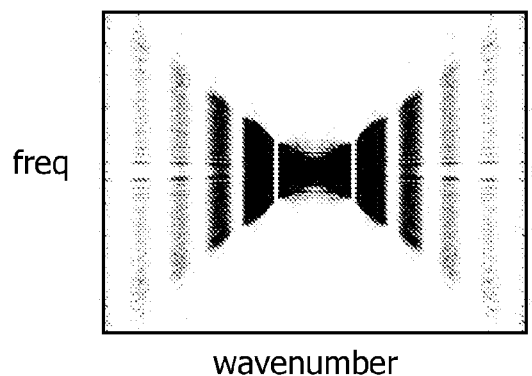
Figure 4C:
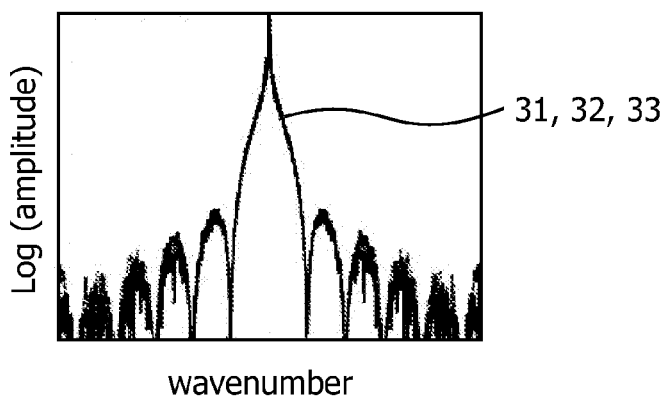

Levin et al have shown a way to resolve this problem. This is illustrated in FIGS. 4A to 4C. Levin et al proposed to move the sensor laterally along a parabolic trajectory in space-time. FIGS. 4A to 4C illustrate the proposal by Levin et al. In space time (FIG. 4A) the position of the light impinging on the sensor follows a parabolic trajectory during the exposure time. A parabolic trajectory creates identical motion blur for a range of velocities up to the maximum velocity at which the sensor was moved. This is illustrated in FIG. 4C by the fact that the various PSF functions for the three velocities are nearly identical. The effective blur kernel can be established by means of time-integration and for a parabolic trajectory the blur kernel is proportional to $1/\sqrt{x}$. Although the recorded images will appear severely blurred even for static objects, the blur can be removed using a fixed, motion-independent inverse filter kernel. Since the three PSF functions are nearly the same and inverse PSF operation, i.e. deconvolution of the image, can provide sharp images for all speeds. However, Levin et al correctly note that their approach is only applicable for 1D motion (e.g., purely horizontal motion). Furthermore, the PSF functions shows that for several wavelengths the amplitude is zero due to the finite dimensions of the aperture, so some details will be irretrievably lost. Therefore, although Levin at al do provide a way of mitigating the problems, the solution only works partially and only if the direction of the motion is known and only in so far as said motion is parallel to the motion of the sensor. For any other motion or any component of motion not parallel to the motion of the sensor, no solution is provided and the situation is as bad a given in FIGS. 3A to 3C.

Nagahara et al have proposed a solution for another problem, namely the restriction in DOF, i.e. Depth of field. By moving the sensor along the optical axis, the sensor is swept through all possible focal planes and this allows, by deconvoluting the recorded images, to get an image with a much larger depth of field. Nagahara et al shows that the PSF function for static objects at various distances from the lens can be made nearly the same. Thus a single IPSF can be used for deconvoluting the image of various static objects at different distances from the lens, resulting in an increased depth of field.

Figure 5A:
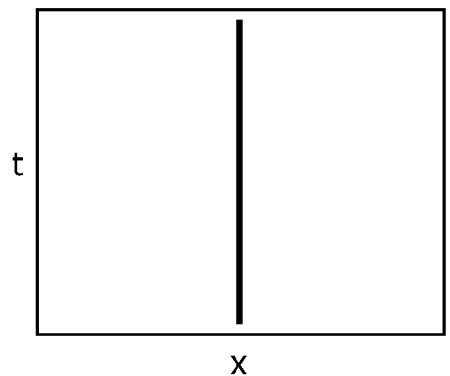
FIGS. 5A to 5C illustrate an operation as known from Nagahara et al
Figure 5B:
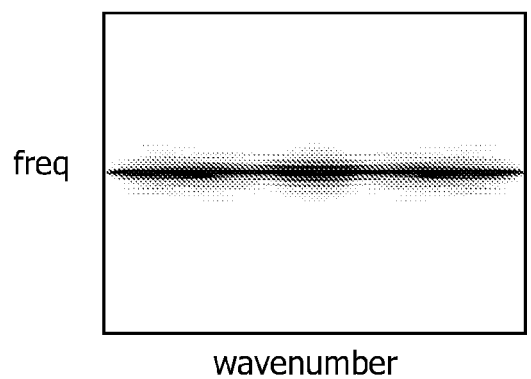
Figure 5C:
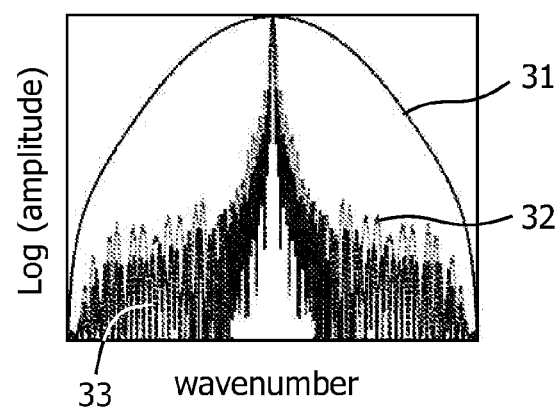

FIGS. 5A to 5C illustrates the situation for a typical set-up as given in the examples of Nagahara when one does not have static objects, but considers objects at various object speeds. The PSF functions 31, 32, 33 (FIG. 5C) for various object speeds, in this case 0, 50 and 100 km/hour as in FIGS. 4A to 4C, differ greatly. Because the PSF functions differ greatly application of an single inverse PSF function will not enable a sharp image to be provided for the speeds indicated. Thus, although Nagahara et al increases Depth of Field (DOF), motion blur remains a problem. Objects that speed by give a blurred image.

Thus, none of the prior art documents or techniques allow an effective motion blur reduction, unless the motion or the direction of the motion would be known in advance, or the camera is moved or motion vectors can be established, which is often not the case.

Figure 6A:
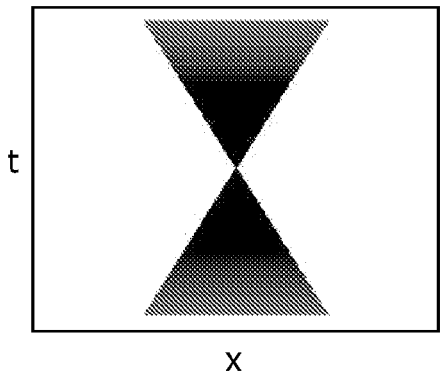
FIGS. 6A to 6C illustrate the present invention.
Figure 6B:
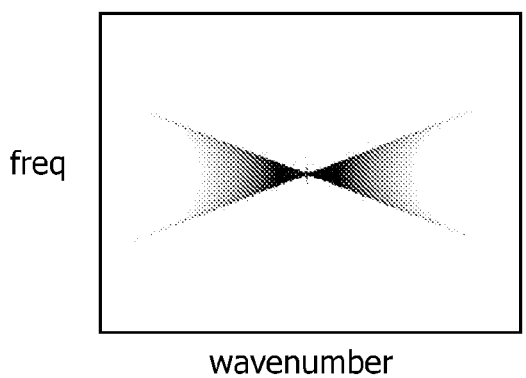
Figure 6C:
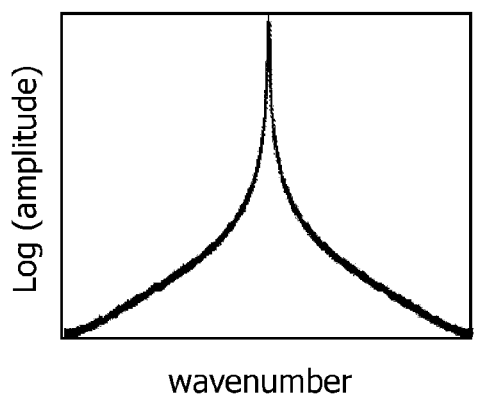

FIG. 6A to 6C illustrate the invention. The sensor is moved along the optical axis wherein the following condition holds:

$$V_{sweep} * A/b^2 > 0.25 \text{ sec}^{-1}$$

In the example of FIGS. 6A to 6C the following conditions hold:
$V_{sweep}$=22.4 mm/sec
A=2 mm
b=4.002 mm
distance object to lens=10 meter
exposure time=0.02 sec
$V_{sweep} * A/b^2$=2.8 sec$^{-1}$ In space time (FIG. 6A) the graph has the shape of a diabolo; the important aspect is that the PSF functions for the various velocities 0, 50 and 100 km/hour are nearly identical (FIG. 6C).

Since the PSF functions are nearly identical, deconvolution of recorded images using a single IPSF function is possible and allows a sharp image to be obtained for all objects at the indicated speeds, i.e. motion invariant imaging or near motion invariant imaging is possible for any speed up to 100 km/hour. The very important difference with the solution of Levin et al, is that for any speed in any direction perpendicular to the optical axis up to 100 km/hour at 10 meter distance, a motion invariant imaging is possible. The restriction to particular speed direction inherent in the teaching of Levin et al has thus been removed. Also, the PSF functions do not shows dips, as for Levin et al (and for Nagahara) and thus more details can, in principle, be reconstructed. Thus, by moving the sensor along the optical axis motion invariant imaging, without the restriction to direction, and with a higher degree of retention of details, proves to be possible provided conditions are met. The very important difference with Nagahara is that the three PSF functions are nearly the same, and thus motion invariant imaging for the speeds indicated is possible, whereas for Nagahara at al it is not.

It is remarked that in the present example it is assumed that the object is in focus at the middle of the exposure period. In FIG. 6A this is illustrated by the fact that the upper part of the diabolo is as large as the lower part. It has been found that even if this is not the case motion invariant imaging is very well possible. If the object is in focus not at the middle of the exposure period but somewhat earlier or later, most of the information is captured, since most of the information is present around the cross point of the diabolo, and a very good motion invariant imaging is possible. Below it will be explained that with insight, some fine tuning is possible.

Within the framework of the invention, in embodiments, the sensor is swept to beyond the possible focal ranges. This will ensure that most of the information will be captured for any object at whatever distance from the lens. In such embodiments more reliable motion invariant imaging is possible.

It is remarked that within the framework of the invention "motion invariant imaging" is not to be so strictly interpreted as to mean that for any speed at any level of detail there would not be a difference in imaging; the object of the invention is to reduce motion variance, i.e. motion blur, within practical limits; a perfect solution is an ideal, not the reality.

The inventors have realized that the maximum object speed for which the PSF functions of an object captured on the sensor is basically the same as that for a static object, and thus motion invariant imaging is possible, depends on the following parameters:

A: Parameters of the object, namely the speed of the object vs. the distance of the object to the lens. An object further away from the lens can be more easily captured at the same speed as an object closer to the lens. This parameter basically provides a measure for how fast the object travels through the sensor image.

B: parameters of the camera or camera system:

B1: The sweep rate of the sensor, the larger the sweep rate, the higher the maximum object speed at which motion invariant imaging is possible B2: The aperture, the larger the aperture, the higher the maximum object speed at which motion invariant imaging is possible B3: the distance lens-sensor.

The relevant camera parameter is $B1*B2/(B3)^2$, i.e. $V_{sweep} * A/b^2$

The inventors have simulated various set-ups, including the ones given in the examples by Nagahara, and established the maximum object speed for an object at which invariant imaging is possible.

Table 1 below gives the results; the first column gives a short description of the source, where the first two lines are the examples in Nagahara, the last five lines provide examples of the present invention; the other columns provide various parameters:

TABLE 1

|  | Object distance (m) | Focal length (mm) | Aperture (mm) | Detector speed (mm/s) | Exposure time (s) | Invariant depth range (m) | Invariant speed range (km/h) | $V_{sweep}*A/b^2$ |
|---|---|---|---|---|---|---|---|---|
| Nagahara | 2 | 9 | 6.2 | 0.23 | 0.360 | 1-∝ | 0-0.0128 | 0.0176 |
| Nagahara | 2 | 12.5 | 8.9 | 0.44 | 0.360 | 1-∝ | 0-0.171 | 0.025 |
| Example 1 | 2 | 9 | 4.5 | 250 | 0.360 | 0.01-∝ | 0-100 | 13.8 |

TABLE 1-continued

| | Object distance (m) | Focal length (mm) | Aperture (mm) | Detector speed (mm/s) | Exposure time (s) | Invariant depth range (m) | Invariant speed range (km/h) | $V_{sweep}*A/b^2$ |
|---|---|---|---|---|---|---|---|---|
| Example 2 | 2 | 12.5 | 4.5 | 352 | 0.360 | 0.01-∞ | 0-100 | 10.14 |
| Example 3 | 2 | 9 | 4.5 | 25 | 0.036 | 0.07-∞ | 0-10 | 1.38 |
| Example 4 | 10 | 4 | 2 | 22.4 | 0.02 | 0.07-∞ | 0-100 | 2.8 |
| Example 5 | 5 | 4 | 2 | 2.24 | 0.2 | 0.07-∞ | 0-5 | 0.28 |

It is apparent that the examples of Nagahara do not provide any noticeable motion invariant imaging. Although, with the help of the insight of the present invention, it can be calculated that motion invariant imaging for speeds of up to about 0.15 km/hour for an object at a distance of 2 meters with the devices of Nagahara is possible, this is of no practical use and in fact imperceptible. The invariant speed ranges for the examples 1 to 5 of the invention are practical speed ranges, ranging from the speed of a walking person or jogging person to the speed of a car.

It is further remarked that in the above table the Nagahara examples use f/1.4, often the largest possible aperture, whereas in the examples 1 to 5 of the invention a more modest f/2 is used. If the same f/# is used, the difference with regards to invariant speed range and $V_{sweep}*A/b^2$ even becomes a factor 1.4 larger. With an aperture of f/2 for the examples of Nagahara, in order to do a proper comparison to the invention, the invariant speed range for Nagahara is even a factor 1.4 smaller than indicated in the table, i.e. about 0.1 km/hour.

If one takes for instance a surveillance camera, a reasonable lower practical limit for an invariant speed range is a speed of 5 km/hour, the speed of a walking person at a distance of 5 meter, a reasonable distance for a surveillance camera. This provides for an under limit for $V_{sweep}*A/b^2$ of 0.25 sec$^{-1}$.

Preferably the parameter $V_{sweep}*A/b^2$ is more than 0.5 sec$^{-1}$, most preferably more than 1 sec$^{-1}$.

Preferably the parameter $V_{sweep}*A/b^2$ is less than 15 sec$^{-1}$, most preferably less than 5 sec$^{-1}$. Too large a parameter requires quite high sweep speeds or very small sensor distance.

Preferably the exposure time is between 0.005 and 0.05 seconds, preferably between 0.01 and 0.05 sec. In particular under low light conditions this range of exposure times allows good quality motion invariant images to be taken. This range also allows video images to the taken.

Too long an exposure time could also require a very substantial movement of the sensor, possibly going out of range of reasonable movements of the sensor.

Within the preferred exposure time range the movement of the sensor is within reasonable bounds while yet providing quite long exposure times. Also, within this range of exposure times between 0.01 and 0.05 seconds video sequences can be made.

Preferably the motion of the sensor is linear. In FIG. 6A this is shown by the fact that the diabolo is within two straight lines. Similar to a parabolic trajectory as proposed by Levin, this provides a sampling with an equal weight over a range of motions. By time-integration, the inventors established that the point spread function (PSF) of this spatio-temporal sampling pattern is proportional to 1/log(x), which is an easy function to invert. Comparison of FIGS. 3B, 4B, 5B to 6B illustrate that fan-sampling (FIG. 6B) better preserves high frequencies than a parabolic trajectory (FIG. 4B) and suffers less from sinc-modulations in the spatio-temporal frequency domain. As a result, the acquired images are better suited for inverse filtering. Finally, the phase characteristics of the fan-like sampling are superior to those achieved with parabolic lateral sampling.

Figure 7A:
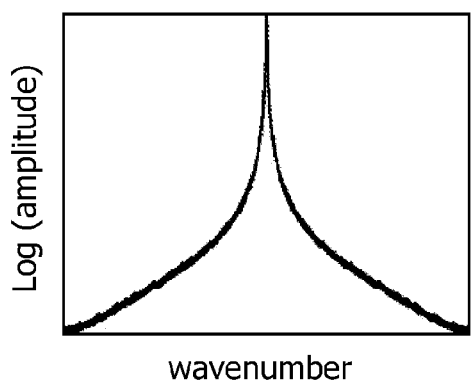
FIGS. 7A to 7C illustrate inverse filtering of the PSF function of FIG. 6C.
Figure 7B:
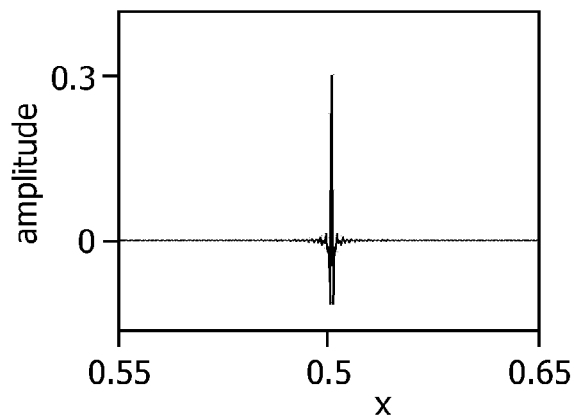
Figure 7C:
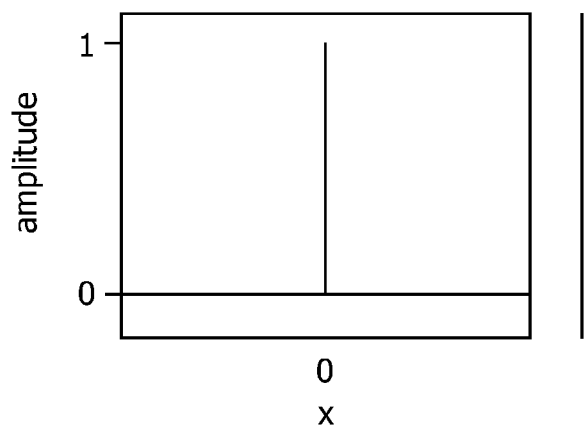

FIGS. 7A to 7C illustrate inverse filtering of the PSF function of FIG. 6C. FIG. 6C is repeated in FIG. 7A.

The other frames, FIGS. 7B and 7C correspond to the (middle) inverse filter and the convolution of the inverse and forward PSF.

FIGS. 7A and 7B show the spatial PSF and the corresponding inverse filter. It should be noted that the inverse filter has a short finite spatial signature, which means that it is computationally efficient to implement. For confirmation, FIG. 7C shows the convolution of the forward and inverse blur kernel, which is a unit pulse as desired.

After inverse filtering, all objects will be repositioned to the location at which they resided when the sensor crossed the respective focal distance (cross point of the diabolo), thus exhibiting a depth-dependent phase (phase shift is zero for crossing at halfway the exposure). Parabolic lateral sampling as in Levin et al, however, suffers from motion-dependent phase shifts, such that after inverse filtering all objects will appear sharp but at locations through which they moved at slightly different times. This results in small inconsistencies particularly at motion boundaries and occlusion areas. Compared to Levin et al, this provides for an important advantage for the invention.

Preferably the effective spatial blur kernel varies linearly with time. This can be accomplished by linearly modulating the distance between the sensor and the main lens along the optical axis. This is due to the fact that the extent of the out-of-focus blur is proportional to the sensor displacement. Such motion is already conducted in most autofocus cameras, albeit before taking a picture or when the shutter is closed. As a result, it is conceivable that in some cameras the autofocus machinery can be readily used to accomplish the desired sampling by performing the motion while taking a picture, provided that the motion and shutter can be controlled and synchronized sufficiently accurately.

It is remarked that in case $V_{sweep}*A/b^2$ would vary during exposure, the relevant parameter is a time average of Vsweep*A/b$^2$ over the exposure time. As explained in relation to FIG. 1, an alternative embodiment of the required spatio-temporal sampling is by fixing the sensor-lens displacement and sweeping the focal length of the main lens during the exposure time (bottom part of FIG. 1). Obviously, this requires switchable optics, such as fluid focus lenses or birefringent LC-materials. Switchable LC-based lenses have been applied in 3D screens, where they are used to change between 2D (no lens effect) and 3D mode. Refractive index can only change in one direction (cylindrical lenses only). A variable focal length can also be accomplished with a fluid-filled membrane, which can be deformed through fluid pressure. Again, preferably the image plane is swept linearly over time: $b=b_0+c_0 t$. As the image plane distance is related to the object distance and the focal length of the lens via the lens equation:

$$1/f=1/v+1/b,$$

It follows that the focal length should preferably be changed over time according to:

$$f(t)=1/(1/v+1/(b_0+c_0 t)),$$

where f(t) denotes the lens focal length as a function of time and $c_0$ is a constant.

A combination of the two is also possible for instance to restrict the physical motion of the sensor or its sweep speed, yet increasing the amount of spatio-temporal sampling (i.e. the extent of the diabolo in FIG. 6A) or increase the sweep speed.

Figure 8:
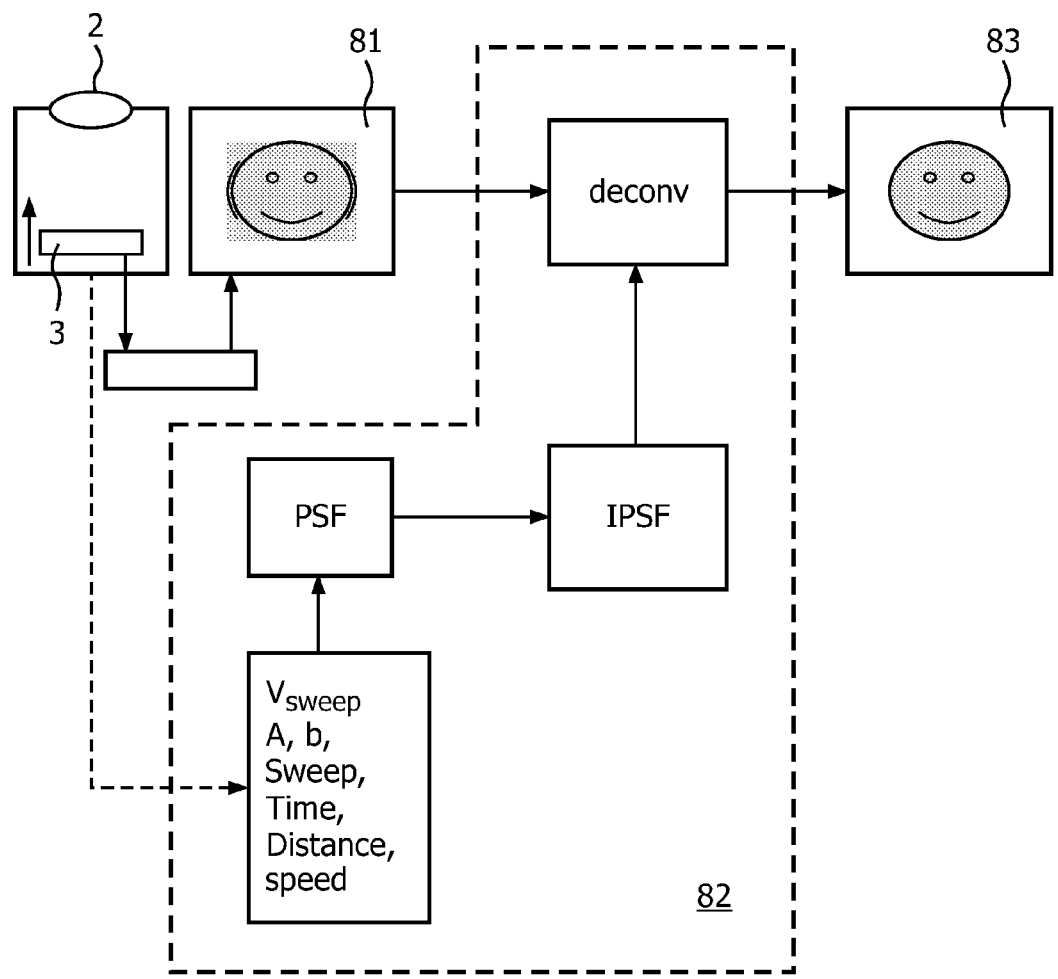
FIG. 8 illustrates an algorithm, system and method to filter a recorded image.

FIG. 8 illustrates a method for deconvoluting a recorded image and a system for recording image data and deconvoluting of recorded image data. The image is recorded by the camera, comprising a lens 2 and a moving sensor 3. The data of the sensor are read by a reader. The corresponding image 81 is schematically shown as blurred. The recorded image is deconvoluted in deconvolutor 82. The system thus comprises a deconvolutor to deconvolute the image data. The method deconvolutes the recorded image data. The deconvolutor performs a deconvolution operation on the recorded image. For ease of understanding the algorithm and method is shown in a number of steps. The first step is to calculate a point spread function. In a simple embodiment the point spread function is dependent on the parameters $V_{sweep}*A/b$. In simple embodiments the PSF function is calculated for a static object at the middle of the sweep range. Since, as explained above, for a large range of speeds the PSF functions are nearly independent of the speed for embodiments of the invention, an IPSF for a static object at the middle of the sweep range will be a good first order approximation for an optimal PSF for all speeds. In more advanced embodiments the distance of the object is used to fine-tune the PSF and thereby the IPSF. The distance of an object can for instance be recorded by the camera. Most cameras have some sort of autofocus that allows a determination of an object distance. As explained above it has been found that even if an object is not in focus in the middle of the sweep motion invariant imaging is very well possible. If the object is in focus not at the middle of the exposure period but somewhat earlier or later, most of the information is captured, since most of the information is present around the cross point of the diabolo, and a very good motion invariant imaging is possible. However, although using a PSF function for a static object in the middle of the sweep range will give good results, somewhat improved results may be obtained by fine-tuning the PSF by making the PSF dependent on the object distance and possibly further parameters. This will provided for a somewhat asymmetric and sheared PSF. The end result will be a somewhat sharper image for a moving object at a particular distance from the lens, at the costs of somewhat less sharp image at other distances. It is remarked that the object distance can also be used for determining, in embodiments of the invention, the sweep rate. As explained above a determining factor is the speed of the object divided by its distance to the lens. Thus for objects at 2 meter distance at a given speed, as compared to objects at 10 meter distance at the same speed, it could be advantageous to use a faster sweep speed, i.e. increase $V_{sweep}$. In embodiments of methods of operation a camera according to the invention at least one or more of the group of parameters consisting of distance of an object to the lens, speed of an object, direction of the speed of the object is measured and the sweep speed is set in dependence of the measured parameter. This would, in its turn, have an influence on the parameters for the PSF.

The speed of the object may also be an input for de deconvolutor 82. Again, although the invention allow a single PSF function for all speeds to be used, some second order effects are still possible wherein the PSF can be fine-tuned for a particular speed. A possible field of application would be speed camera; which already provide for a good estimation of the direction and the speed of an object.

Calculation have shown that a small, second order, motion direction dependence may be present in the PSF. In embodiments the optimum PSFs for a range of directions is calculated and the used PSF is a selection within of this range dependent on an input of direction. The selection may be for instance the maximum, the minimum, the median, a weighted average etc.

The sweep time may also be an input.

In short, the deconvolutor may have inputs to fine-tune the to be used PSF. Various parameters are illustrated in FIG. 8, the most important ones being the sweep rate, the object distance and the speed and direction of speed.

The deconvoluted and sharp image 83 is shown at the right hand side of FIG. 8.

For ease of understanding the method, system and algorithm is presented in various steps, starting with a PSF, and then deriving an inverse PSF from the PSF. Of course, since the IPSF is the important function in the deconvolution, and the IPSF is the inverse of the PSF and vice versa, one could also directly start with the IPSF and the various inputs may just as well be inputs, once translated in the proper fashion for use in the IPSF, for determining the IPSF to be used in the deconvolution.

Preferably the motion of the sensor during recording is in one direction only, for instance only going towards the lens. Although in first order approximation the deconvoluted image is the same independent of the direction of the sweep of the sensor, i.e. independent of whether it moves towards the lens or away from it, in second order approximation this is strictly spoken true only for objects that are in focus at the middle of the sweep of the sensor. For objects further away, or closer to the lens, there is a small difference in the end result, in particular with respect to the position of the object in the deconvoluted image. In a single image this difference is unperceivable or near unperceivable, but in a video sequence a judder in the position of objects may occur. To avoid this effect from occurring the motion of the sensor during the exposure is preferably unilateral, i.e. only in one direction. Of course, the sensor then has to be moved back to the starting position before the next data can be recorded. In this embodiment there will be an additional restriction on exposure time, in order to allow the sensor to move back to the starting position.

Figure 9:
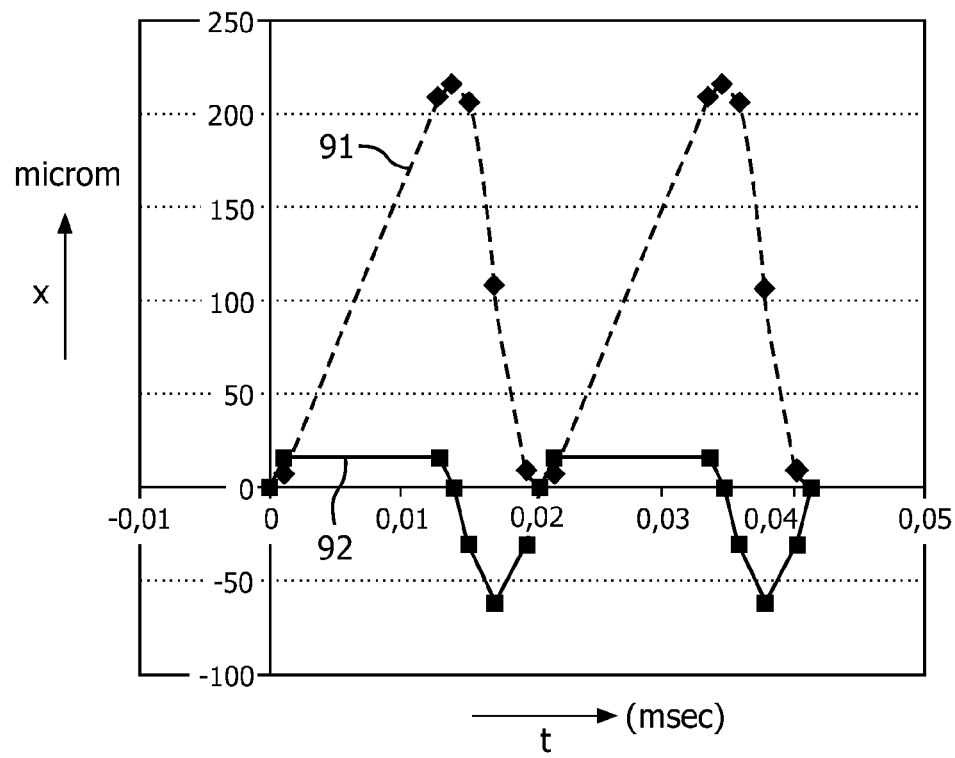
FIG. 9 illustrates movement of the sensor.
Figure 10:
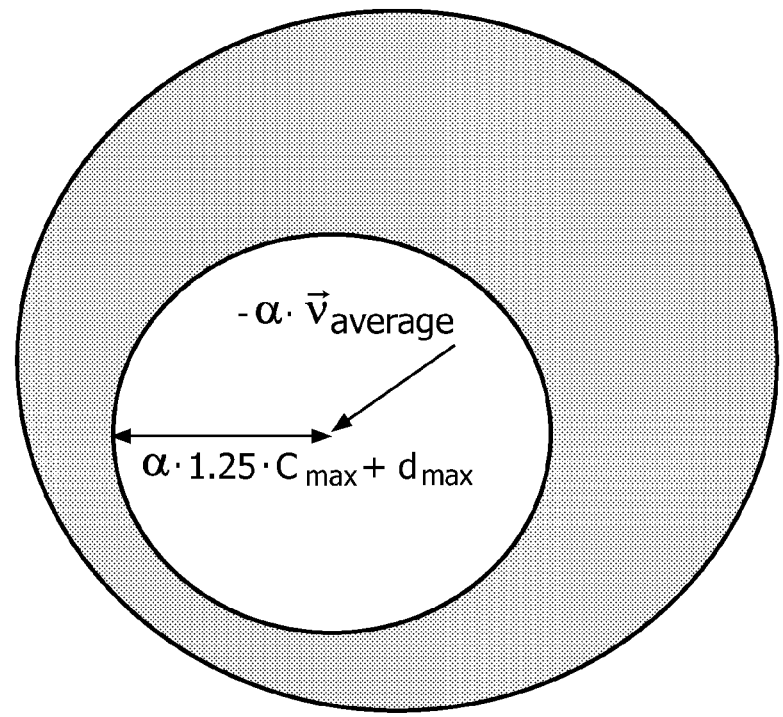
FIG. 10 is an example of an optimized aperture when knowing more information about occurring objects speeds in the scene.
Figure 11:
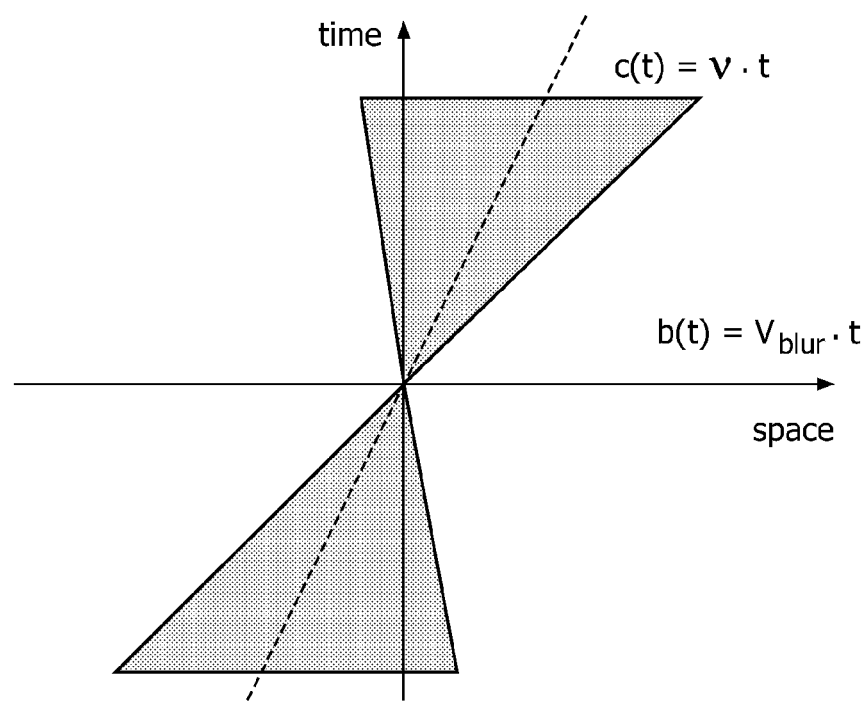
FIG. 11 Shows the double cone integration for a generic non-speed-optimized system, when an object moves FIG. 12 Shows an embodiment with orthogonally shifted sensor, over distance d_sensor.
Figure 12:
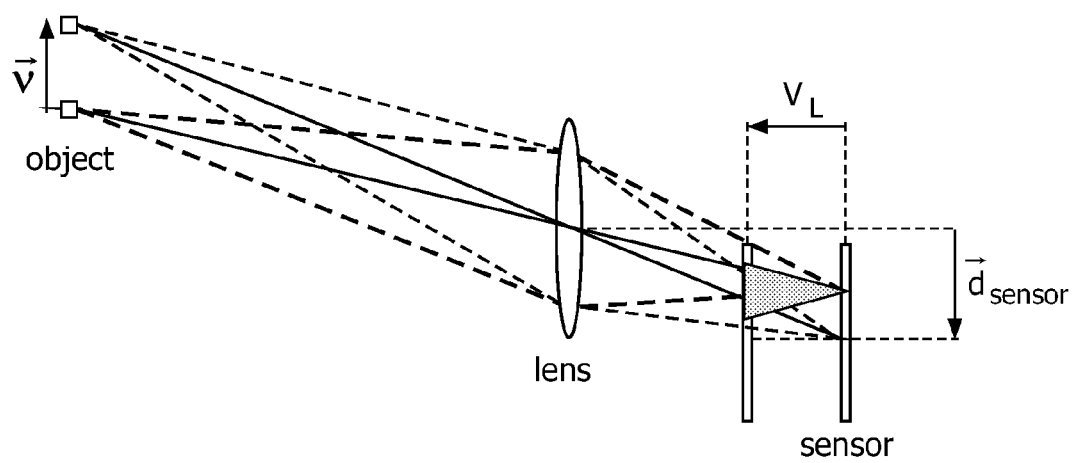

FIG. 9 illustrates the movement of the sensor. Line 91 represents the distance traveled by the sensor, line 92 the velocity of the sensor. During a first time period the sensor is brought up to speed, illustrated in line 92 by the fact that the velocity increases from 0 to a fixed speed which is maintained for some time. Thereafter the sensor is stopped and quickly returned to its original position. The return of the sensor will mean that only a part of the time data can be recorded, in this example for instance only for approximately 50-70% of the time. When the sensor is moved back and forth, which would for instance be possible if single shot are made, the sensor does not have to be brought back to its original position. As explained above the movement can be brought about in two different manners, or any combination thereof, either by physically moving the sensor, or the lens, or by changing the characteristic of the lens.

For short exposure times or fast movement of the sensor it is advantageous to use for at least a part of the movement a change in the characteristics of the lens.

In short, the motion-invariant camera according to the invention provides sharp high-quality video or images in particular under low illumination conditions. Although beneficial for most cameras and optical imaging systems, including consumer cameras and camcorders, this is particularly valuable for some professional surveillance and monitoring applications. For example, surveillance cameras in security systems often need to operate in dark surroundings. Current surveillance cameras feature expensive solutions, such as sensor cooling to obtain the desired SNR levels. The current invention can be used to either provide a cost-efficient alternative for a high dynamic range camera or may be used to increase the dynamic range of current sensors even more. It should be noted that this invention describes a novel way of sampling light and can therefore be implemented using any existing photo sensor technology.

The invention can be described as a camera and system comprising a camera in which, during exposure, the ratio of the distance between the lens and the sensor and the focal length is changed. The rate of change is set such that motion invariant imaging is achievable for practical speed ranges, i.e. speed of up to at least 5 km/hour at 2 meter distance of the lens, by deconvoluting the compound image. Preferably the achievable speed range is at least twice as high. A linear motion of the sensor is preferred.

It should be noted that, although the above described methods and apparatuses can work blindly without having to know anything about the occurring object speeds in the scene and consequently on the sensor, if one has information regarding those increased reconstruction precision can be achieved (i.e. sharper/better final images). This can be done either statically (e.g. one knows which typical speeds occur, e.g. in a machine vision application where one knows the speed of the conveyer belt upon which objects to be analyzed come by), or dynamically, in which the system (e.g. iteratively) measures the speeds of the objects in the scene and adjusts the parameters of the below alternative embodiments optimally.

A first improvement consists of choosing a (coded) aperture taylored to the occurring object speeds, which could be done e.g. with a liquid crystal element before the lens, or between lens and sensor etc. E.g., if one has a typical object speed (e.g. average motion of a dominant object of the scene) v_average and deviations thereon from other object speeds (e.g. people on the train waving) of Cmax, one could choose a circular subarea of the original aperture, e.g. according to:

$$A = \{\vec{a} : \vec{a} + \alpha \cdot \vec{v}_{average} | 1.25 \cdot \alpha \cdot C_{max} + d_{max}\},$$

in which $$\alpha = \frac{xf^2}{V_L(x-f)^2},$$

and x the distance from object (imaged point) to lens, f the lens focal length, and VL the speed of displacement along the optical axis of the sensor. The dmax is an uncertainty parameter regarding the position of the object image on the image plane (i.e central rays through the lens center from an object point on positions on the sensor at distance d from the sensor center, should have distances d<dmax). This corresponds to a circle being displaced with alpha times v_average, and a radius of 1.25*alpha*Cmax+dmax.

Of course more complicated aperatures can be optimally determined, e.g. a ring shape for rotating objects.

Another embodiment to improve the image given knowledge of typical object speeds (e.g. an object moving at speed v_obj and a static background) is to not only move the sensor along the optical axis, but also orthogonal to it (creating a diagonal composite motion).

Motion tracking of an object can be done by moving the whole camera in a panning motion, or alternatively by translation of the sensor perpendicular to the optical axis.

According to this present embodiment, one can combine motion tracking with the focus sweep concept, creating a system that moves the imaging plane at an angle to the optical axis. The method or apparatus of the embodiment decomposes the sensor motion into two orthogonal vectors: Vsweep along the optical axis and $V_{TR}$ perpendicular to it.

Translation of the sensor along $V_{TR}$ creates a shearing of the double cone integration (which are the cones that occur due to a time-dependent blurring by sweeping the sensor), with such an angle that compensates for an average object speed $\vec{v}_{average}$. When doing nothing the blur Kernel's in the DCI would be symmetric around the vertical for stationary objects, but moving objects create a sheared version of this cone. One can (partially) shear it back by having a counter-translational motion $V_{TR}$.

Instead of being centered on zero motion, the range of invariant speeds is now centered on the tracking speed $\vec{v}_{average}$. For motion along the optical axis, the embodiment may create motion invariance by defening an optimal sweep speed and range depending on the average speed, e.g.:

$$V_L \geq \frac{C_{max} x f^2}{(0.8a - d_{max})(x-f)},$$

in which a is the system's aperture.

I.e. the sweep speed is chosen to cover the pre-defined range of invariant speeds:

$$|\vec{v} - \vec{v}_{average}| \leq C_{max}.$$

Note that an object speed need not be exactly matched to generate a sharp image. As long as the object's speed falls within the invariant range (i.e. covering in the example both the moving object speed v_obj and the zero static speed), a sharp reconstruction is possible.

I.e. one can exchange a more precise tracking for a lesser sweep, or vice versa do the tracking (of at least some objects) inprecisely, but have a broader DCI cone i.e. larger sensor sweep. Preferably the sweep speed and translation are optimized together so that both stationary and moving objects can be correctly reconstructed.

Another embodiment increases the imaging quality by off-setting the sensor orthogonal to the optical axis. Since the motion of the scene object on the sensor is both a function of the geometrical projection through the imaging system, and the motion of the sensor itself:

$$|v_{on\ sensor}| = \left| \frac{\vec{v}y}{x} + \frac{\vec{d}V_L}{y} \right|$$

In which v is the image object, y the distance between lens and the image plane of theoretical sharpness (which will typically be the halfway point of the sensor sweep), d the distance from the sensor center of an imaged point, and VL the sensor sweep speed.

According to the present embodiment one wants to make this on sensor speed small to reduce the motion blur, which can e.g. be done by choosing an offset of the sensor:

$$\vec{d} = -\frac{\vec{v}y^2}{xV_L} = -\frac{\vec{v}xf^2}{(x-f)^2 V_L}$$

If one displaces the sensor with speed $$V_L \approx \frac{C_{max}xf^2}{(0.8a - d_{max})(x-f)^2}$$

one obtains a typical optimal displacement of:

$$\vec{d}_{sensor} \approx -\frac{\vec{v}_{mean}(0.8a - d_{max})}{C_{max}}.$$

Note that for the above three embodiments one can choose several parameter optima (e.g. several aperture shapes—e.g. sizes—, several orthogonal motions, and several sensor displacements, since not only do these depend on what reconstruction accuracy one desires, and e.g. the complexity of the inverse filtering, but also one can to various degrees combine the above three principles, and e.g. reduce sweep along the optical axis and/or orthogonal motion, by choosing a more optimal sensor displacement (on average).

The invention claimed is:

1. A camera comprising a lens and an image sensor where a ratio of a distance between the image sensor and the lens along an optical axis and a focal length is changed during an exposure time of an imaged object, said camera being adapted to operate such that the following holds:

$$V_{sweep} * A/b^2 > 0.25\ sec^{-1}$$

where $V_{sweep}$ represents the velocity of motion along the optical axis of at least one of:
the sensor relative to the lens;
the lens relative to the sensor; and
a change in focal length;
and where A represents the aperture and b represents the distance between the lens and the sensor.

2. A camera as claimed in claim 1 where $V_{sweep} * A/b^2$ is more than 0.5 sec⁻.

3. A camera as claimed in claim 1 where $V_{sweep} * A/b^2$ is less than 15 sec$^{-1}$.

4. A camera as claimed in claim 1 where the camera is adapted to provide exposure times in the range from 0.005 to 0.05 seconds.

5. A camera as claimed in claim 1 where the velocity is linear.

6. A camera as claimed in claim 1 where said ratio is changed such that the sensor reaches positions outside of a range in which the imaged object is in focus.

7. A camera as claimed in claim 1 where the motion includes a displacement of the sensor relative to a focal plane, said displacement being dependent, at least in an upper range of exposure times, on the exposure time.

8. A camera as claimed in claim 1 where at least one characteristic of the lens is changed.

9. A camera as claimed in claim 1 comprising a means to measure the distance of an object, where $V_{sweep}$ is made dependent on the measured distance.

10. A camera as claimed in claim 1 where the camera comprises a video camera and the movement of the sensor during the exposure time is only in one direction.

11. A system for recording images of objects, said system including a camera comprising a lens and an image sensor where a ratio of a distance between the image sensor and the lens along an optical axis and a focal length is changed during an exposure time of a recorded image of an object, said camera being adapted to operate such that the following holds:

$$V_{sweep} * A/b^2 > 0.25\ sec^{-1}$$

where $V_{sweep}$ represents the velocity of motion along the optical axis of at least one of:
the sensor relative to the lens;
the lens relative to the sensor; and
a change in focal length;
and where A represents the aperture and b represents the distance between the lens and the sensor;
said system further including a deconvolutor for deconvolution of the recorded image.

12. A system as claimed in claim 11 where the deconvolutor has an input for inputting at least one of a group of parameters including:
distance of an object to the lens;
speed of an object;
direction of the motion of the object;
sweep rate;
tee aperture A;
the distance b between the lens and the sensor;
sweep distance;
the exposure time.

13. A method of operating a camera comprising a lens and an image sensor where a ratio of a distance between the image sensor and the lens along an optical axis and a focal length is changed during an exposure time of an imaged object, said camera being operated such that the following holds:

$$V_{sweep} * A/b^2 > 0.25\ sec^{-1}$$

where $V_{sweep}$ represents the velocity of motion along the optical axis of at least one of:
the sensor relative to the lens;
the lens relative to the sensor; and
a change in focal length;
and where A represents the aperture and b represents the distance between the lens and the sensor.

14. A method as claimed in claim 13 where at least one of a group of parameters including:
distance of an object to the lens;
speed of an object;
direction of the motion of the object;
is measured and the velocity $V_{sweep}$ is set in dependence on the measured parameter.

* * * * *